Jan. 10, 1950 F. E. ALTMAN 2,494,025
OPTICAL OBJECTIVES WITH TWO PART NEGATIVE
COMPONENT HAVING VARIABLE CENTRAL
AIR SPACE OF ZERO POWER
Filed May 28, 1948 2 Sheets-Sheet 1

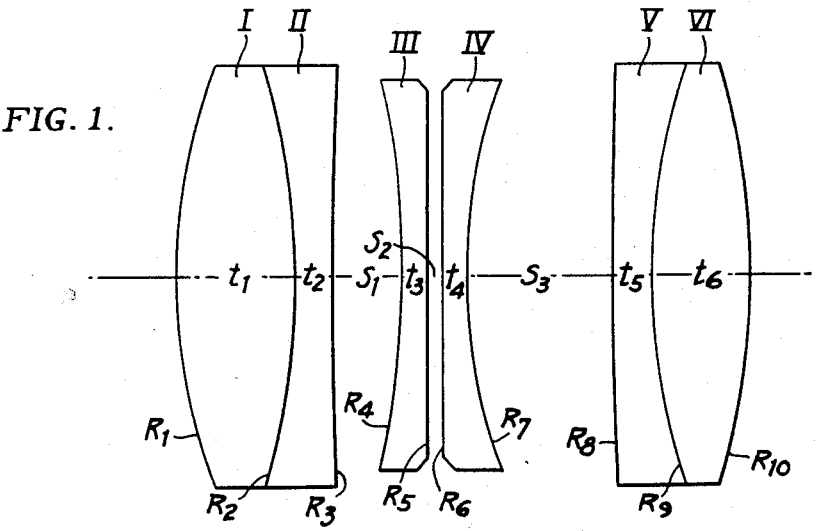

| EF = 100 MM. | | | | f/8.0 | |
|---|---|---|---|---|---|
| LENS | $N_D$ | V | RADII | THICKNESSES | |
| I | 1.611 | 57.2 | $R_1$ = +27.07mm | $t_1$ = | 5.81 mm. |
| II | 1.572 | 57.4 | $R_2$ = −31.97 | $t_2$ = | 1.85 |
| | | | $R_3$ = +299.0 | $S_1$ = | 3.12 |
| III | 1.605 | 38.0 | $R_4$ = −63.33 | $t_3$ = | 1.11 |
| | | | $R_5$ = ∞ | $S_2$ < | 1.0 |
| IV | 1.605 | 38.0 | $R_6$ = ∞ | $t_4$ = | 1.11 |
| | | | $R_7$ = +26.54 | $S_3$ = | 6.74 |
| V | 1.605 | 38.0 | $R_8$ = +469.4 | $t_5$ = | 1.85 |
| VI | 1.744 | 45.8 | $R_9$ = +36.51 | $t_6$ = | 4.44 |
| | | | $R_{10}$ = −62.64 | | |

FIG. 3.

| MAGNIFICATION | 15 TO 1 | 4 TO 1 |
|---|---|---|
| $S_2$ | 0.39 mm. | 0.56 mm. |
| EQUIVALENT FOCAL LENGTH | 99.93 mm. | 99.87 mm. |
| BACK FOCAL LENGTH | 82.67 | 82.44 |
| LONG CONJUGATE | 1592. | 492.3 |
| SHORT CONJUGATE | 89.33 | 107.28 |
| SPHERICAL ABERRATION | +0.19 | +0.18 |
| PRIMARY CURVATURE 20.7° | +0.065 | +0.009 |
| SECONDARY CURVATURE 20.7° | +0.076 | +0.167 |

FRED E. ALTMAN
INVENTOR
BY Newton M Pierce
Harold F. Bennett
ATTORNEY & AGENT

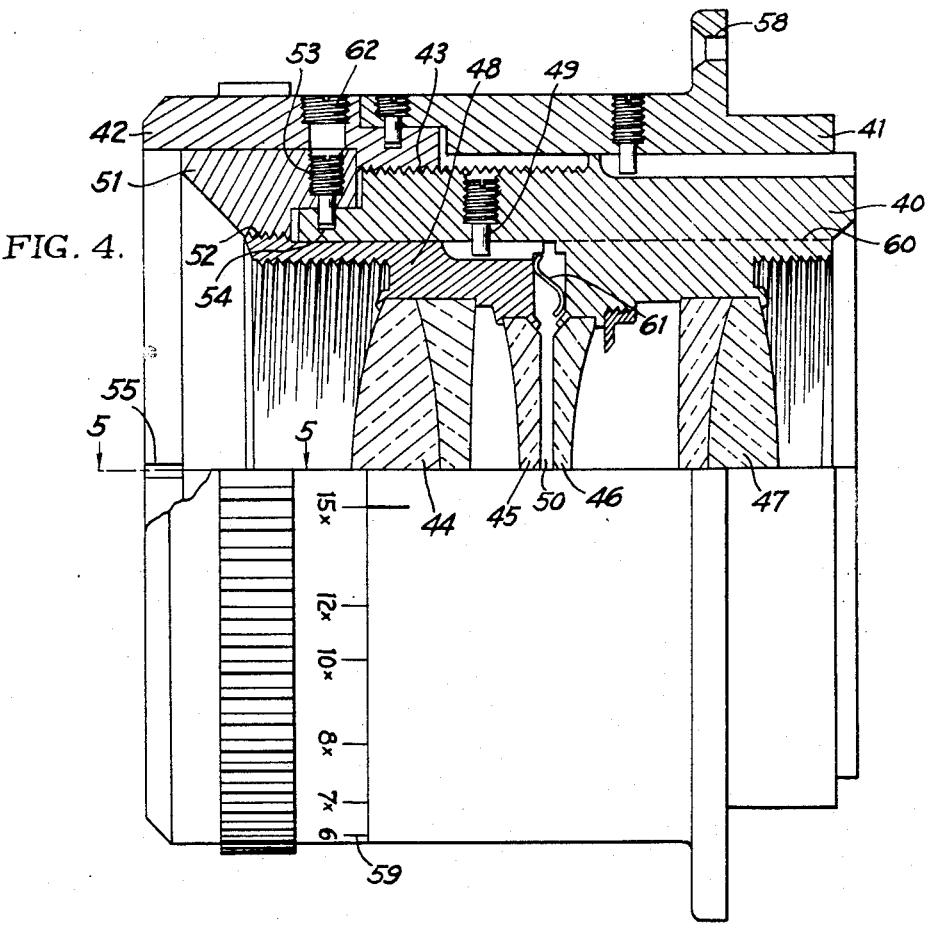
FIG. 4.
FIG. 5.
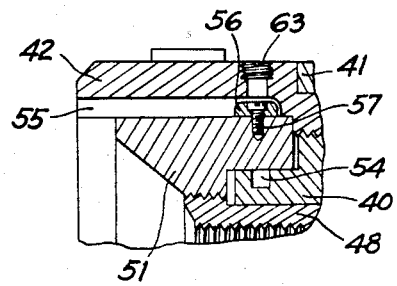
FRED E. ALTMAN
INVENTOR

Patented Jan. 10, 1950

2,494,025

UNITED STATES PATENT OFFICE 2,494,025

OPTICAL OBJECTIVES WITH TWO-PART NEGATIVE COMPONENT HAVING VARIABLE CENTRAL AIR SPACE OF ZERO POWER

Fred E. Altman, Rochester, N. Y., assignor to Eastman Kodak Company, Rochester, N. Y., a corporation of New Jersey Application May 28, 1948, Serial No. 29,799

3 Claims. (Cl. 88—57)

This invention relates to photographic lenses.

The object of this invention is to produce a lens which gives extremely sharp definition (more than 100 ruled lines per mm. at the axis) and maintains a flat field at different magnifications over a range of the order of from 4X to 15X.

It is a particular object of the invention to provide a lens which gives this performance and avoids one of the difficulties of manufacture previously encountered.

Another object of the invention is to provide an improved form of the invention disclosed in a copending application, Serial No. 29,833 by Reiss, filed concurrently herewith.

In my Patent No. 2,279,384, I described a type of objective consisting of a biconcave element air spaced between two positive cemented doublets. This type of objective has proven to be very superior for use in microcopying of documents and printed matter, for which use it is very desirable to obtain a high degree of resolution in the image, and such lenses proved very satisfactory in use at any given magnification for which the lens was particularly designed. Difficulty was encountered in making the lens however, because a small change of thickness in a biconcave element had a great effect upon the curvature of field and the unavoidable variations in thickness in production caused some lenses to be rejected because of an inward curving field and some because of a backward curving field. The present invention puts this apparent difficulty to good use.

The usual practice is to vary one of the air spaces during the assembly of an objective so as to restore the curvature of field to the value desired. In the case of lenses of this type, however, the two air spaces are not particularly suitable for correcting the field because they also affect the other aberrations so that when the field is flattened the spherical aberration or the coma was often found to be too large to be tolerable. An error in the thickness of the central element, on the other hand, has very little effect on spherical aberration and coma.

Lenses of this type were also found to have an inward curving field at low magnifications. The following values of curvature of field were computed for a lens of this general type designed for use at 15X magnification:

| Magnification | 15:1 | 4:1 |
|---|---|---|
| Primary curvature, 20.7° | 0.00 | −0.99 |
| Secondary curvature, 20.7° | +0.05 | −1.81 |

This change in curvature of more than a millimeter at the short conjugate is sufficient to lose the critical definition required in microcopying work. The present invention efficiently utilizes these aberration sensitivities to balance each other.

According to the present invention the negative element is divided into two halves separated by a small air space of zero power, and this space is varied to control the curvature of field. Preferably each half consists of a plano-concave element with the plano surfaces facing each other and with a small air space between. I have discovered that altering the space between the two halves has the same kind of effect on the curvature of field as altering the thickness of the single element in the original lens, and it is readily apparent that the air space can be changed much more easily than the thickness of a solid element. As a matter of fact, a change in the air space is N times as effective as the same amount of change in thickness of glass would be where N is the refractive index of the glass.

A further incidental advantage of the invention is that the two halves of the central component are less sensitive to errors in centering than the single central element in the original lens. This is true whether or not the central airspace has zero power; thus dividing the central component into two negative components is a specific improvement on my patent mentioned above.

In applying my invention under practical conditions there are two aspects to be considered. First, during manufacture the space of zero power is adjusted to compensate for the unavoidable variations in thickness of the two halves of the central component. Second, during use the central space may be varied to produce a flat field at different magnifications, and in particular it is advantageous to mount the objective in accordance with the invention described in the copending Reiss application above mentioned so that the variation of the space of zero power is definitely correlated with the magnification and the change in both conjugate distances. Each of these two aspects is very useful, and the combination of both is particularly useful in high-grade microfile lenses wherein the greatest possible resolving power is required. It is noted that Reiss' broad idea was to maintain a good image by adjusting the most sensitive airspace available, whereas my invention introduces a special airspace particularly advantageous for this purpose.

There are also other types of lenses in which a change in thickness of one of the elements has a greater effect on the curvature of field than an equal change in any one of the normal air spaces, and the present invention can be advantageously embodied in any such lens type, particularly if high-quality images are required.

In the accompanying drawings:

Fig. 1 shows a diagram of a lens according to the invention.

Fig. 2 shows the constructional data for such a lens.

Fig. 3 shows the important characteristics of the lens at different magnifications.

Fig. 4 is a side elevation partly cut away of a mounted lens in accordance with the invention.

Fig. 5 is a horizontal sectional detail of the mount shown in Fig. 4.

Fig. 1 shows a cross-sectional diagram and Fig. 2 gives the constructional data for an objective according to the invention. The constructional data is repeated here for convenience.

EF=100 mm.  f/8

| Lens | N | V | Radii | Thicknesses |
|---|---|---|---|---|
| I | 1.611 | 57.2 | $R_1=+27.07$ mm. | $t_1=5.81$ mm. |
| II | 1.572 | 57.4 | $R_2=-31.97$ | $t_2=1.85$ |
|  |  |  | $R_3=+299.0$ | $s_1=3.12$ |
| III | 1.605 | 38.0 | $R_4=-63.33$ | $t_3=1.11$ |
|  |  |  | $R_5=\infty$ | $s_2<1.0$ |
| IV | 1.605 | 38.0 | $R_6=\infty$ | $t_4=1.11$ |
|  |  |  | $R_7=+26.54$ | $s_3=6.74$ |
| V | 1.605 | 38.0 | $R_8=+469.4$ | $t_5=1.85$ |
| VI | 1.744 | 45.8 | $R_9=+36.51$ | $t_6=4.44$ |
|  |  |  | $R_{10}=-62.64$ |  |

In this table the lens elements are numbered by Roman numerals from front to rear. The second and third columns of the table give the refractive index N for the D line of the spectrum and the dispersive index V for each element. The radii R and thicknesses $t$ and spaces $s$ are each numbered by subscripts from front to rear. The plus and minus signs on the radii indicate surfaces that are convex and concave respectively to the front.

The elements III and IV together correspond to the element III in any of the figures of my patent above referred to. It will be noted that the combined thickness of the two plano-concave elements is greater than the thickness of the single biconcave element in some of the examples shown in my prior patent. As is known, a certain minimum thickness in each element is required for economy in manufacture, usually about .01 F. In designing the lens according to the present invention the curvatures of the various surfaces were modified to compensate for the effective change in thickness in the central component and also to correct the aberrations for a magnification of 15 times rather than for infinite object distance. The adaptation to a magnification of 15 times is purely incidental, since the present invention can be applied equally well to lenses corrected for infinite object distance.

The following table gives the coefficients of change of the aberrations of the lens shown as Example 3 of my above-mentioned patent when the thickness $t_3$ of the central component is increased by 0.1 mm. or when either of the air spaces $s_1$ and $s_2$ is increased by 0.1 mm. This set of coefficients is typical of all the examples shown therein.

| Thickness or space | $t_3$ | $s_1$ | $s_2$ |
|---|---|---|---|
| Spherical aberration, f/4.5 | −.028 | −.131 | −.009 |
| Sine condition coma f/4.5 | −.012 | −.010 | −.011 |
| Primary curvature, 21° | +.192 | −.002 | +.031 |
| Secondary curvature, 21° | +.063 | +.013 | +.021 |
| Distortion, 21° | +.002 | +.023 | −.022 |

It will be noted that the thickness of the central component has a much greater effect on the curvature of field as compared with the effect on the spherical aberration, than does either air-space. It was this condition which caused the difficulties of manufacture and high percentage of rejects at final inspection as the curvature of field was greater than the factory tolerance if the central component was made only a little thicker or thinner than specified. The present invention permits the thickness of the central component to be changed to correct for variations in manufacture during the assembly of the objective, much more effectively than could be done by varying either of the air spaces in front or behind the central component. It also provides a much more effective means of maintaining the corrected curvature of field when the magnification is changed as described in the copending application by Reiss, already mentioned.

Figure 3 shows some of the pertinent data for a lens according to the present invention, at two different magnifications, when the central space $s_2$ is changed. This data is repeated in the following table along with certain additional data:

| Magnification | 15:1 | 4:1 |
|---|---|---|
| $s_2$ | 0.39 | 0.56 |
| Equivalent focal length | 99.93 mm. | 99.87 mm. |
| Back focal length | 82.67 | 82.44 |
| Front focal length | 92.82 | 92.81 |
| Long Conjugate | 1592 | 492.3 |
| Short Conjugate | 89.33 | 107.28 |
| Spherical aberration f/8 | +0.19 | +0.18 |
| Primary curvature 20.7° | +0.065 | +0.009 |
| Secondary curvature 20.7° | +0.076 | +0.167 |
| Primary curvature 15° | +0.041 | +0.013 |
| Secondary curvature 15° | −0.270 | −0.350 |
| Lateral color (G'-D) | +0.006 | +0.010 |

It will be noted that the change in the central space $s_2$ is about $1/106$ of the change in the short conjugate. This lens, mounted and used with the central space variable during use, gives highly satisfactory results in actual practice. Also it has been found satisfactory in practice to make the change in the space linearly proportional to the change in the short conjugate distance for all intermediate magnifications.

Figure 4 is a side elevation partly in section, and Fig. 5 is a partial horizontal section of a mount for this objective which is described in greater detail in a joint patent application Serial No. 29,798 filed concurrently herewith by myself and Joseph A. Blash. In this objective as shown the lens barrel 40 is splined to the sleeve 41 for focusing when the focusing ring 42 is rotated. The sleeve 41 is provided with conventional means 58 for attaching to the camera at a fixed distance from the image plane (the short conjugate image). The focusing ring 42 is keyed to rotate in the sleeve 41 and moves the barrel 40 by the multiple threads 43, preferably moving it 18 mm. in less than 360° rotation. The two rear lens components 46 and 47 are fixedly mounted in the barrel 40. For ease in manufacture, the barrel 40 may be divided into two parts as indicated by the broken line 60. The front two components 44 and 45 are mounted in a lens cell 48 which is splined in the barrel 40 by the key 49 and a short keyway. The cell 48 is moved forward or backward in the barrel 40 by the ring 51 threaded to the cell by the threads 52 and keyed to the barrel by the key 53 and circumferential keyway 54 when the ring 51 is rotated relative to the barrel and lens cell. The threads 52 have a pitch 1/106 of that of the multiple threads 43, and slack is taken up in these threads by a compression spring 61. The focusing ring 42 is provided with a keyway 55 in a different azimuth from key 53 (shown 90° away in Fig. 4 and in detail in Fig. 5).

When the objective is assembled in the mount ready for final adjustment, it is mounted on a lens bench where the curvature of field can be measured at finite conjugates. The focusing ring 42 is provided with a scale 59 which is then set to indicate the magnification for which the lens bench is set up. The ring 51 is rotated until the lens bench measurements indicate that the field is flat, whereupon it is tapped for the screw 57 for holding the key 56 and the said key 56 is inserted into the keyway 55 and attached. The objective is then ready for use, and the ring 51 rotates with the focusing ring 42 but slides with the barrel 40 so that the change in the central space 50 is 1/106 of the change in the short conjugate distance. To improve the appearance, plugs 62 and 63 are inserted into the holes provided for inserting key 53 and screw 57 during assembly.

This mount is adapted for use with other objectives according to the present invention by choosing a suitable ratio of the threads 43 and 52 and by changing the details of the barrel 40 and the lens cell 48 in a manner well known in the art.

I claim:

1. An optical objective comprising two negative components spaced between two positive doublets, each of the doublets having a positive element cemented to a negative element, the negative element of each doublet being nearer the negative components, the cemented surface of each doublet being convex to the negative components, the positive element of each doublet having an index of refraction at least .025 greater than that of the negative element cemented thereto and in which $$\frac{(N_{II}-N_{I})\Delta}{N_{I}N_{II}R_{2}}$$

is between .006 and .016 where $N_I$ and $N_{II}$ are respectively the indices of refraction of the positive and negative elements of the front doublet, $R_2$ is the radius of curvature of the cemented surface of the front doublet and is negative, and $\Delta$ is the over-all axial length of the lens, the total axial thickness of the two negative components and the airspace between being between .021 F and .06 F where F is the focal length of the objective.

2. An objective according to claim 1 in which each negative component consists of a single plano-concave element, the two plano surfaces being adjacent.

3. An objective according to claim 1 mounted in a camera which focuses for different magnifications by moving the objective as a whole, and provided with means for slightly varying the airspace between the two negative components when the whole objective is moved for focusing.

FRED E. ALTMAN.

REFERENCES CITED

The following references are of record in the file of this patent:

UNITED STATES PATENTS

| Number | Name | Date |
| --- | --- | --- |
| 1,361,207 | Warmisham | Dec. 7, 1920 |
| 1,937,168 | Repp | Nov. 28, 1933 |
| 2,279,384 | Altman | Apr. 14, 1942 |

FOREIGN PATENTS

| Number | Country | Date |
| --- | --- | --- |
| 22,607 | Great Britain | of 1893 |
| 3,799 | Great Britain | of 1912 |
| 537,460 | France | Mar. 3, 1933 |
| 697,038 | Germany | Oct. 4, 1940 |